Feb. 21, 1928.
D. T. SHARPLES
1,660,211
GOVERNOR
Filed Jan. 14, 1926
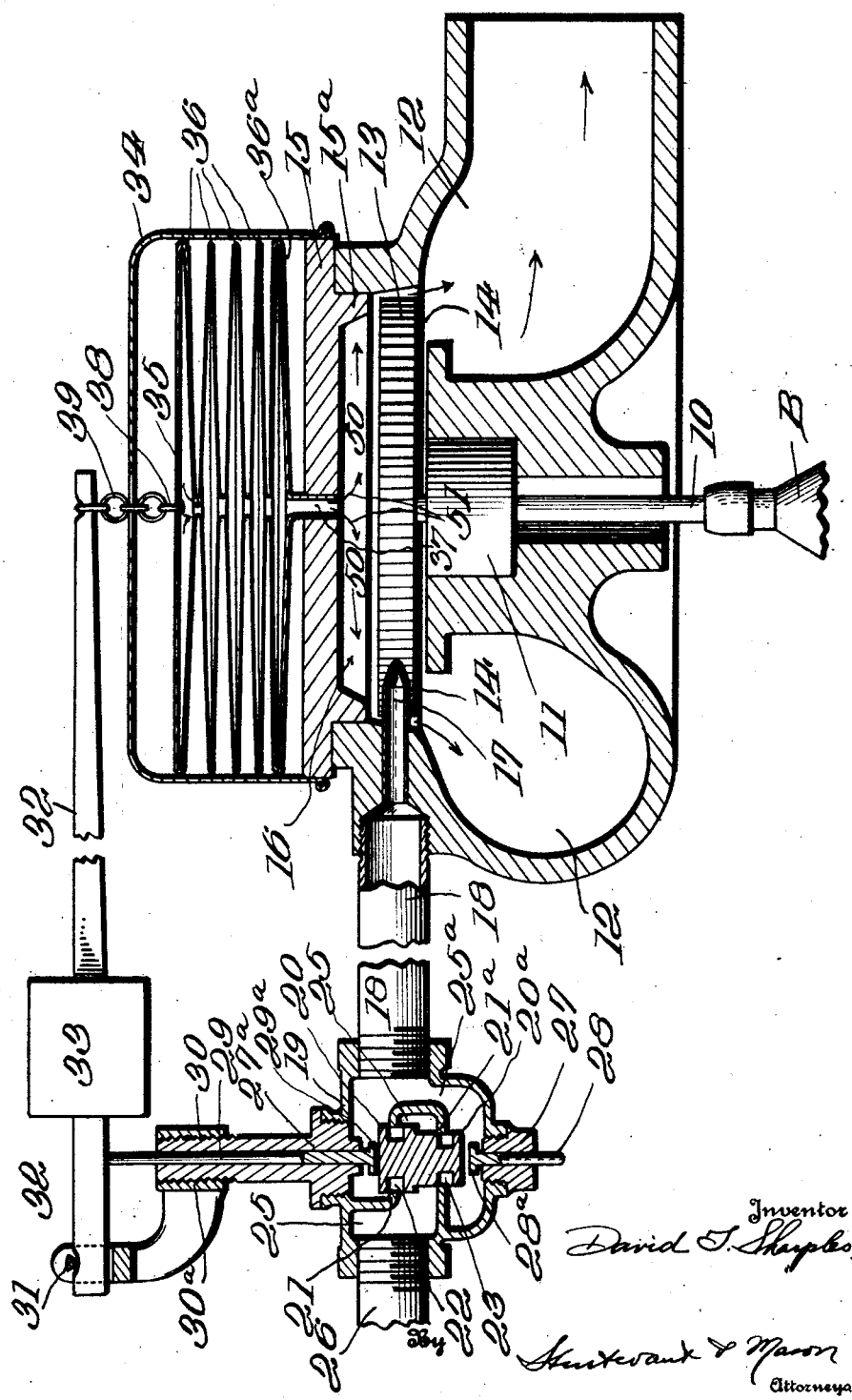
Inventor
David T. Sharples,
By
Sturtevant & Mason
Attorneys Patented Feb. 21, 1928.

1,660,211

UNITED STATES PATENT OFFICE.

DAVID T. SHARPLES, OF WEST CHESTER, PENNSYLVANIA.

GOVERNOR.

Application filed January 14, 1926. Serial No. 81,219.

This invention relates to governors for use with high speed machinery.

The high speed at which such machinery operates makes it difficult to attach the usual forms of rotary governor devices, because even a small shaft revolving at several thousand revolutions per minute and transmitting only a low power renders the design and operation of a gear train therefrom a matter of great difficulty, and the working of the same and its probability of rapidly wearing out leave much to be desired. In the previously proposed devices, such a gear train or other positive mechanical connection was considerably essential.

The present invention proposes to substitute for such usual positive mechanical connection by links or levers between the revolving element and the valve actuating mechanism, an arrangement which operates by virtue of a drag or traction exerted through space between elements which are not positively connected together, but which by reason of their nature and disposition are enabled to exert such relative effects. In the illustrative form of the invention, the revolving element is caused to effect a variation of air pressure by reason of the centrifugal forces, whereby this variation is a function of the centrifugal forces and hence of the relative speeds. By reason of this centrifugal action upon the air, decrease of air pressure is produced at or near the axis of rotation, with respect to the atmospheric pressure prevailing, and this difference of pressures is caused to initiate the governing action. The faster the revolving element rotates, the higher will be the partial vacuum created, and the greater the relative difference of pressures.

By reason of centrifugal action in the air, an increase of pressure is produced at the periphery of the revolving element, and a partial vacuum near the center. The faster the wheel revolves, the greater will be the vacuum at the center and the greater the pressure at the periphery.

For the purpose of illustrating the method of employing this invention, it has been demonstrated on the accompanying drawing as applied to the control of a steam turbine wheel revolving about a vertical axis, and used to drive a centrifugal separator bowl, in which the wheel itself constitutes the revolving element, and the partial vacuum in the air produced opposite the center of this wheel is employed by a pressure responsive element for the governing action. It is obvious, however, that this is not a limitation, and that the pressure responsive element may be mounted opposite any part of the structure which, by virtue of the speed of rotation, has pressure differences engendered thereat, and that the system may be applied in general to any type of mechanism in which a governing of a supply or a flow of fluid, or a power connection is necessitated in some regular proportion to the rotational speed of a machine element.

The drawing represents such a governor and turbine assembly in cross-section, and diagrammatically presents the arrangement of the elements of the assembly.

The turbine has a shaft 10 carried vertically in a bearing 11, which in turn is mounted in the interior of a casting having formed integrally therein the ring chamber 12 for the escape of the exhaust steam from the turbine disk. The turbine wheel 13 is keyed to the upper end of the shaft 10 opposite the annular slot 14 in the upper face of the ring chamber 12. The cover 15 with annular flange 15$^a$ fits tightly upon the casting and provides a clearance space 16 between its lower wall and the upper face of the turbine wheel.

The turbine wheel 13 is designed to receive the steam from a nozzle or nozzles 17, absorb the energy of the steam and be rotated thereby, and discharge the exhaust steam through the annular slot 14. This steam is delivered to the nozzle 17 through a pipe 18 from the throttle valve having a casing 19. This throttle valve has the unbalanced valve piston with a large diameter 20 and a small diameter 20$^a$ which slides in the apertures of the webs 21, 21$^a$ in the interior of the valve casing, and has the grooves 22 and 23 in its respectively sized peripheries substantially opposite the webs. The central chamber 25 of the valve between the webs communicates through a further pipe 26 with a source of steam. At the bottom of the valve casing is a plug 27 which has a pin 28 slidable therein, which has an enlarged inner end 28$^a$ to prevent withdrawal, through the plug, and is in operative relation with the bottom of the piston portion 20ª. The top of the casing has a similar plug 27ª with a similar pin 29 slidable therein, with an enlarged inner end 29ª likewise to prevent withdrawal, and in operative relation with the top of the piston 20. This upper plug carries on its upper exterior portion by a threaded portion 30 a bracket arm 30ª which has at its outer end a knife-edge 31.

A balance arm 32 is carried by this knife-edge 31 and carries the weight 33 thereon, which may be adjusted to various desired positions along the length of the arm, to regulate the steam pressure necessary to move the arm. The pin 29 engages the arm 32 at its lower edge, and for any given adjustment, the ratios of the piston diameters of the unbalanced piston 20, 20ª, the lever arm from fulcrum 31 to pin 29 along the arm 32, and the position of the weight 33 must be suitably chosen with regard to each other.

Mounted on the cover 15 is a hood 34 open to the atmosphere and enclosing a flexible diaphragm of the metallic disk bellows type, comprising the closed end disk 35 and the intermediate disks 36, the last disk being connected with the tube 37 leading to the interior of the cover and opening into the clearance space 16. The end plate 35 has a ring 38 fastened thereto, which is connected by a chain 39 with the outer or free end of the arm 32.

The operation of the device is as follows: When the main throttle valve (not shown) is opened, and steam admitted into the pipe 26, the pressure in the clearance space 16 is the same as the atmospheric pressure. Furthermore, the pressure prevailing in the clearance space 16 is the same as in the exhaust ring chamber 12 and the latter in turn is practically at atmospheric pressure. The arm 32, however, is in a lowered position under the action of weight 33, with the piston 20, 20ª resting against the head 28ª of the pin 28. The steam is thus substantially shut off by the presence of the webs 21, 21ª in obstructing contact with the walls of the peripheries 20, 20ª of the piston valve. The steam pressure in pipe 26, however, acts upon the unbalanced piston valve 20, 20ª to raise the same, and therewith the pin 29, the lever 32, and associated elements. Steam then flows through the grooves 22, 23 around the webs 21, 21ª from the valve chamber 25 into the valve chamber 25ª and thence by the pipe 18 into the nozzle 17 and thus actuates the turbine wheel. At the same time, as stated above, the upward movement of the valve piston 20, 20ª causes it to push the pin 29 upward and raise the arm 32 about its fulcrum 31, thus tightening the chain 39 and placing the end plate 35 of the flexible diaphragm 35, 36 under a slight tension.

As the speed of the turbine wheel 13 increases, the air contained in the clearance space 16 is engaged therewith by friction and then carried outward by centrifugal force towards the periphery of the turbine wheel 13, in the direction of the arrows 50 thus causing an evacuation of the air towards the center of the wheel, which is replenished until balance is established by air from the interior of the flexible diaphragm as shown by the arrows 51. The difference in pressure on the interior and exterior of this diaphragm will then cause the end plate 35 to be pressed downward, drawing with it the arm 32 and the pin 29, thus depressing the valve piston 20, 20ª to shut off a part of the passage through the webs 21, 21ª by the grooves 22, 23, in the periphery of the valve piston. In this way, the supply of steam received and therefore the pressure prevailing in the nozzle 17 is decreased, and the wheel slows down.

If the valve piston 20, 20ª should stick—which would be indicated by the failure of steam to flow from the steam main 26 into and through the turbine, the operator can disengage the valve by forcing the projecting pin 28 upwardly.

In practice it has been found that a great pressure difference is thus produced at, for example, the operating speed of a centrifugal separator bowl B suspended from the end of the shaft 10, which is around 12,000 revolutions per minute: but considerable pressure differences occur at any high speed.

On the contrary, if the wheel 13 slows down below the predetermined speed, the centrifugal action no longer causes so great a relative evacuation of air opposite the center of the turbine wheel, and the arm 32 is allowed to be raised again by the unbalanced valve piston 20, 20ª and the valve once more admits a greater amount of steam.

Since the raising power of the unbalanced piston and the depressing power of the flexible diaphragm 35, 36 as exerted upon the arm 32 may be regulated by the relative load the piston has to raise, it is apparent that by suitably moving the weight 33 along the arm, the governor may be set for any desired speed, and that for a given size of piston and nozzle, etc., the arm may be calibrated to indicate the speed at which the associated turbine is to run. The relative heights of the fulcrum 31 and the end disk 35 of the flexible diaphragm may be regulated by means of the screw threads 30 on the upper end of the plug 27ª.

If the flexible diaphragm should develop a leak or become disconnected or fail in any wise to function, the steam pressure will force the unbalanced valve piston 20, 20ª upward until the grooves 22, 23 pass the webs 21, 21ª and the steam supply is shut off: in this way affording an absolute safeguard against overspeeding if the governor fails.

Obvious changes may be made in the form of construction and arrangement of the device without departing from the scope of the appended claims.

I claim:

1. In a governor for steam turbines having a turbine wheel, a steam inlet control valve, a chamber defining a clearance space at one side of and next to the turbine wheel, whereby the turbine wheel in its rotation creates a vacuum in said chamber in proportion to the speed of the turbine wheel, devices connected to said control valve for shifting the same for varying the supply of steam to the turbine wheel, and means having communication with said clearance space and operated by the vacuum suction therein for actuating said valve controlling devices.

2. In a governor for steam turbine, having a turbine wheel, a nozzle, and an unbalanced steam inlet control valve; a chamber defining a clearance space above the wheel extending substantially to the periphery of the said wheel, a flexible diaphragm in communication with said clearance space on the one side and the atmosphere on the other, a lever connected with said valve and normally raised by the pressure of the incoming steam, and means connecting said diaphragm and said lever to close said valve in proportion to the speed of said turbine as determined by the action of centrifugal force upon the fluid within said clearance space.

In testimony whereof, I affix my signature.

DAVID T. SHARPLES.